US008923672B2

(12) United States Patent
Bernasconi et al.

(10) Patent No.: US 8,923,672 B2
(45) Date of Patent: Dec. 30, 2014

(54) WAVELENGTH ROUTER FOR A PASSIVE OPTICAL NETWORK

(75) Inventors: Pietro A. G. Bernasconi, Aberdeen, NJ (US); David T. Neilson, Old Bridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 275 days.

(21) Appl. No.: 13/293,787

(22) Filed: Nov. 10, 2011

(65) Prior Publication Data

US 2013/0121695 A1    May 16, 2013

(51) Int. Cl.
G02B 6/34         (2006.01)
H04J 14/02        (2006.01)

(52) U.S. Cl.
CPC ................................. *H04J 14/0204* (2013.01)
USPC ............................................... 385/37; 385/46

(58) Field of Classification Search
CPC .... G02B 6/34; G02B 6/12007; H04J 14/0204
USPC ................ 385/37, 46, 14, 87; 398/49; 438/31
See application file for complete search history.

(56) References Cited

U.S. PATENT DOCUMENTS

| 5,546,483 | A | * | 8/1996 | Inoue et al. ..................... 385/14 |
| 5,574,584 | A | * | 11/1996 | Darcie et al. ................... 398/72 |
| 5,600,742 | A | * | 2/1997 | Zirngibl ......................... 385/37 |
| 5,864,413 | A | * | 1/1999 | Feldman et al. ................ 398/72 |
| 6,014,390 | A | * | 1/2000 | Joyner ........................... 372/20 |
| 6,243,402 | B1 | * | 6/2001 | Doerr ............................. 372/20 |
| 6,873,766 | B2 | | 3/2005 | Dragone |
| 8,625,990 | B2 | | 1/2014 | Yu |
| 2002/0085787 | A1 | * | 7/2002 | Doerr .............................. 385/15 |
| 2003/0194181 | A1 | | 10/2003 | Dragone |
| 2004/0218259 | A1 | | 11/2004 | Hui et al. |
| 2004/0264857 | A1 | * | 12/2004 | Bernasconi ..................... 385/37 |
| 2005/0053332 | A1 | * | 3/2005 | Doerr ............................. 385/37 |
| 2005/0169567 | A1 | * | 8/2005 | Bernasconi et al. ............ 385/11 |
| 2006/0115271 | A1 | | 6/2006 | Hwang et al. |
| 2007/0019956 | A1 | * | 1/2007 | Sorin et al. ..................... 398/71 |
| 2007/0104409 | A1 | * | 5/2007 | Nara et al. ...................... 385/14 |
| 2011/0236021 | A1 | | 9/2011 | Presi et al. |

FOREIGN PATENT DOCUMENTS

EP          1 150 143  A2   10/2001

OTHER PUBLICATIONS

Smith, Joseph et al., Wolfgang, "Colorless ONT Laser for Cyclic WDM PON Scheme," U.S. Appl. No. 61/416,859, filed Nov. 24, 2010.

Pöhlmann, Wolfgang et al., "Method for Operating and Optical Transmission System, Optical Transmitter and Optical Receiver," European Application No. 11290035.2, filed on Jan. 21, 2011.

(Continued)

*Primary Examiner* — Peter Radkowski
(74) *Attorney, Agent, or Firm* — Mendelsohn, Drucker & Dunleavy, P.C.; Yuri Gruzdkov; Steve Mendelsohn

(57) ABSTRACT

A passive arrayed-waveguide-grating (AWG) router that can be used to implement the dual functionality of a wavelength router and a 3-dB power splitter for one of its wavelength channels while functioning as a conventional wavelength router for the other wavelength channels. The passive AWG router can advantageously be used, e.g., in a WDM-PON system to reduce the insertion-loss disparity between the various wavelength channels that are being used to broadcast optical signals from an optical line terminal located at the service provider's central office, through the passive AWG router, to a plurality of optical network units located near the end users.

21 Claims, 6 Drawing Sheets

(56) References Cited

OTHER PUBLICATIONS

Pöhlmann, Wolfgang et al., "WDM PON with Non Tunable Legacy ONUs," European Application No. 11290084.0, filed on Feb. 11, 2011.

Pearson, Matt, "WDM-PON: A Viable Alternative for Next Generation FTTP," Published in FTTH Prisim Magazine, Mar. 2010 (7 pages).

Dragone, C., "Planar waveguide array with nearly ideal radiation characteristics," Electronics Leters 1st, Aug. 2002, vol. 38 No. 16, pp. 880-881.

Banerjee, Amitabha et al., "Wavelength-division-multiplexed passive optical network (WDM-PON) technologies for broadband access: a review [Invited]," Journal of Optical Networking, Optical Society, Nov. 2005, vol. 4, No. 11, pp. 737-758.

Kamei, S. et al, "64 × 64-channel uniform-loss and cyclic-frequency arrayed-waveguide grating router module," Electronics Leters 9th, Jan. 2003, vol. 39, No. 1, pp. 83-84.

Son, E.S., et al., "Survivable Network Architectures for WDM PON," Optical Fiber Communication Conference, 2005, Technical Digest, OFC/NFOEC, Mar. 2005, vol. 6 (3 pages).

International Search Report and Written Opinion; Mailed Jan. 4, 2013 for the corresponding PCT Application No. PCT/US2012/063788.

Informal Comments as filed on Nov. 11, 2013 for the corresponding PCT Application No. PCT/US2012/063788.

Taiwan Office Action; Mailed Jun. 4, 2014 for the related Taiwan Application No. 101141051.

* cited by examiner

300

WAVELENGTH ROUTER FOR A PASSIVE OPTICAL NETWORK

BACKGROUND

1. Field

The present invention relates to optical communication equipment and, more specifically but not exclusively, to passive wavelength routers.

2. Description of the Related Art

This section introduces aspects that may help facilitate a better understanding of the invention(s). Accordingly, the statements of this section are to be read in this light and are not to be understood as admissions about what is in the prior art or what is not in the prior art.

An access network, also known as a "first-mile network," connects a service provider's central office to businesses and residential subscribers. Access networks are also sometimes referred to in the literature as subscriber access networks or local loops. The bandwidth demand in access networks has been increasing rapidly, for example, because residential subscribers expect first-mile access solutions to provide high bandwidth and offer media-rich services. Similarly, corporate users demand broadband infrastructure through which they can reliably connect their local-area networks to the Internet backbone.

A passive optical network (PON) is an optical fiber-based access network that can typically provide much higher bandwidth than, e.g., traditional copper-based access networks. The incorporation of wavelength-division multiplexing (WDM) in a PON further increases the available bandwidth. However, WDM-PONs have not been widely commercialized yet, partly due to their relatively high cost compared to conventional systems and partly due to immature device technologies and insufficiently developed network protocols and software to support various commercially viable WDM-PON architectures.

SUMMARY

Disclosed herein are various embodiments of a passive arrayed-waveguide-grating (AWG) router that can be used to implement the dual functionality of a wavelength router and a 3-dB optical power splitter for one of its wavelength channels while functioning as a conventional wavelength router for the other wavelength channels. The passive AWG router can advantageously be used, e.g., in a WDM-PON system to reduce the insertion-loss disparity (i.e., the difference in insertion loss between the wavelength having the greatest insertion loss and the wavelength having the smallest insertion loss) between the various WDM channels that are being used to broadcast optical signals from an optical line terminal located at the service provider's central office, through the passive AWG router, to a plurality of optical network units located near the end users.

According to one embodiment, provided is an apparatus comprising a passive AWG router (e.g., 210, 300). The passive AWG router comprises (i) a first optical star coupler (e.g., 320) having a first optical waveguide (e.g., 308) coupled to a first edge (e.g., 318) thereof and a first lateral array of optical waveguides (e.g., 330) coupled to an opposite second edge thereof; and (ii) a second optical star coupler (e.g., 340) having the first lateral array of optical waveguides coupled to a first edge thereof and a second lateral array of optical waveguides (e.g., 360) coupled to an opposite second edge (e.g., 338) thereof. The passive AWG router is configured to route a first carrier wavelength applied to the first optical waveguide to both a first optical waveguide (e.g., $360_A$) of the second lateral array and a second optical waveguide (e.g., $360_E$) of the second lateral array, said first and second optical waveguides of the second lateral array being separated from one another by at least one other optical waveguide (e.g., 360) positioned between them in said second lateral array.

According to another embodiment, provided is an apparatus comprising a passive wavelength router. The passive wavelength router comprises a grating; a first optical port optically coupled to the grating at a first side thereof; and a linear array of second optical ports optically coupled to the grating at a second side thereof. The passive wavelength router is configured to route a first carrier wavelength applied to the first optical port to both a first of the second optical ports and a second of the second optical ports, said first and second of the second optical ports being separated from one another by at least one other of the second optical ports positioned between them in the linear array. The grating can be, for example, an Echelle grating or an arrayed waveguide grating.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

A conventional passive optical network (PON) is a point-to-multipoint, fiber-to-the-premises network architecture in which unpowered passive optical splitters are used to enable a single optical fiber to serve multiple subscribers, typically 16-128. A typical PON includes an optical line terminal (OLT) at the service provider's central office (CO) and a plurality of optical network units (ONUs) near the end users. The optical carrier is shared by the ONUs by means of a passive optical splitter. Downlink signals are broadcast to all ONUs. Uplink signals are routed using a multiple access protocol, usually time division multiple access (TDMA). A PON advantageously reduces the amount of fiber and central-office equipment, e.g., compared to that required for point-to-point architectures. However, the number of ONUs in a conventional PON is limited by the system's optical power budget, which depends on the fiber and components' losses and on the attenuation imposed by the passive optical splitter.

It is therefore very desirable for a PON system to keep the signal-transport losses to a minimum.

In a wavelength-division-multiplexing PON (WDM-PON), multiple carrier wavelengths are used over the same fiber infrastructure, thereby providing scalability. In one WDM-PON architecture, multiple carrier wavelengths are used to arrange the ONUs into several virtual PONs. More specifically, each of said virtual PONs is configured to use a respective dedicated carrier wavelength or set of carrier wavelengths but is otherwise operating as a conventional PON, as indicated above. Other WDM-PON architectures are also possible.

Figure 1:
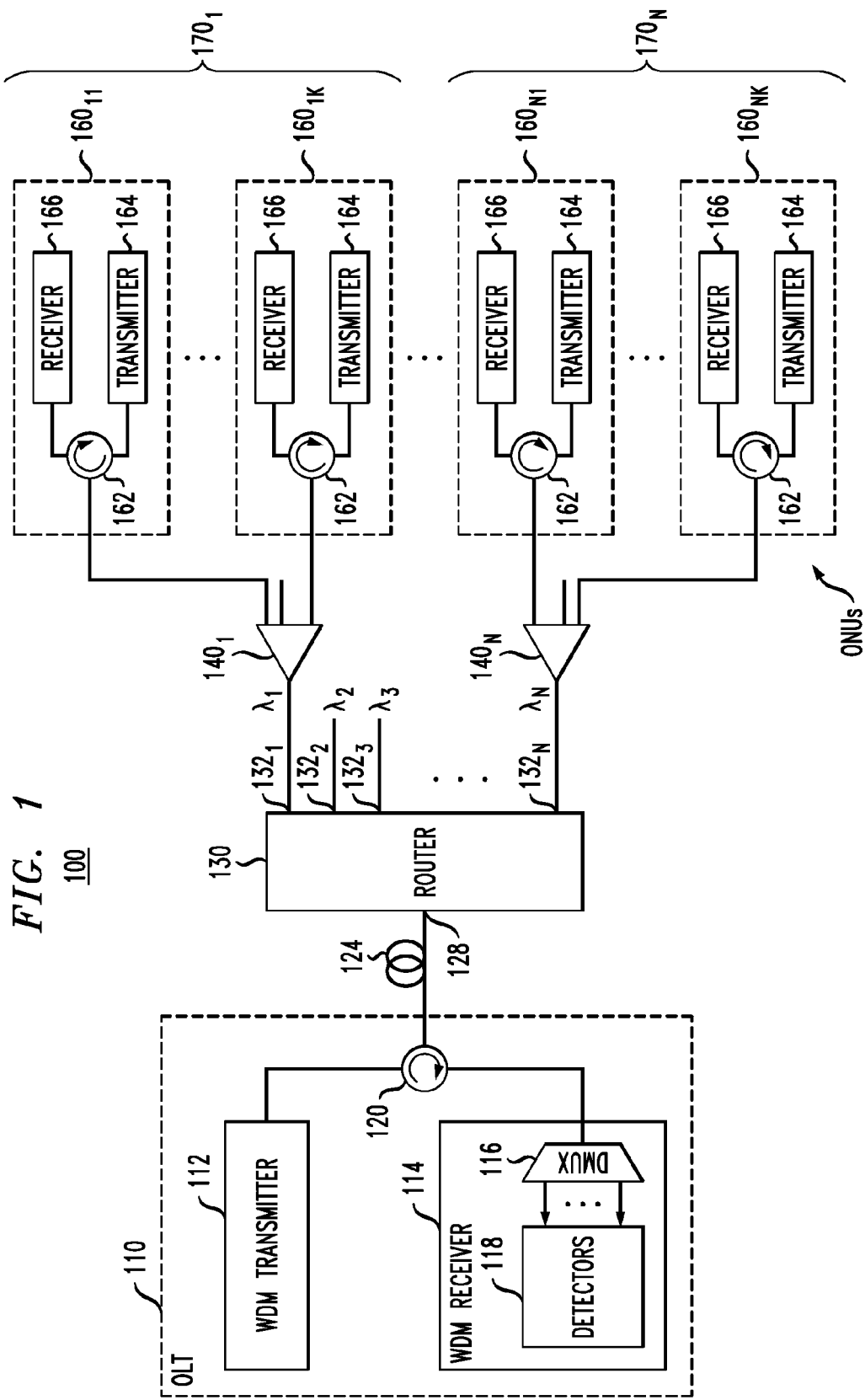
FIG. 1 shows a block diagram of a WDM-PON system according to one embodiment of the invention.

FIG. 1 shows a block diagram of a WDM-PON system 100 according to one embodiment of the invention. System 100 has an OLT 110 configured to communicate with a plurality of ONUs 160 using N carrier wavelengths ($\lambda_1, \lambda_2, \ldots \lambda_N$). OLT 110 includes a WDM transmitter 112 and a WDM receiver 114, both coupled, via an optical circulator 120, to an optical feeder fiber 124. WDM transmitter 112 is configured to broadcast downlink signals to N groups 170$_1$-170$_N$ of ONUs 160 using the N different respective carrier wavelengths. WDM receiver 114 is similarly configured to receive uplink signals from ONU groups 170$_1$-170$_N$. WDM receiver 114 is illustratively shown in FIG. 1 as comprising a (1×N) wavelength de-multiplexer (DMUX) 116 and an array of N optical detectors 118. In a representative embodiment, optical feeder fiber 124 has a length between about 1 km and about 20 km or longer.

Optical feeder fiber 124 is configured to connect OLT 110 to a passive wavelength router 130. Router 130 is designed to route optical signals based on wavelength and has a single port 128 at its first side and a set of N ports 132$_1$-132$_N$ at its second side. Wavelength $\lambda_1$ is routed between ports 128 and 132$_1$; wavelength $\lambda_2$ is routed between ports 128 and 132$_2$; wavelength $\lambda_3$ is routed between ports 128 and 132$_3$, etc. Router 130 operates as a (1×N) wavelength de-multiplexer for downlink signals and as an (N×1) wavelength multiplexer for uplink signals.

Each of up to N ONU groups 170$_n$ is coupled to a respective one of ports 132$_1$-132$_N$ of router 130 via a respective (1×K) passive optical splitter/combiner 140, where n=1, 2, . . . , N. Optical splitter/combiner 140 operates as a power splitter for downlink signals and as a power combiner for uplink signals. Each of up to K ONUs 160$_{nk}$ of ONU group 170$_n$ is coupled to a respective port of optical splitter/combiner 140$_n$ as indicated in FIG. 1 and is configured to operate using a respective carrier wavelength $\lambda_n$, where k=1, 2, . . . , K. In a representative embodiment, K can be between 4 and 128. In various alternative embodiments, the number of different ONU groups 170 may be less than or equal to N, and each ONU group 170$_n$ may independently have less than or equal to K different ONUs 160.

In a representative embodiment, each ONU 160 includes an optical circulator 162, an optical transmitter 164, and an optical receiver 166. Optical circulator 162 is configured to (i) direct downlink signals from the corresponding splitter/combiner 140 to optical receiver 166 and (ii) direct uplink signals from optical transmitter 164 to the corresponding splitter/combiner 140. Both optical transmitter 164 and optical receiver 166 of ONU 160 are configured to operate using the same corresponding carrier wavelength. For example, each of optical transmitters 164 and each of optical receivers 166 in ONU group 170$_1$ is configured to operate using carrier wavelength $\lambda_1$. Similarly, each of optical transmitters 164 and each of optical receivers 166 in ONU group 170$_N$ is configured to operate using carrier wavelength $\lambda_N$, etc. The use of optical circulator 162 prevents collisions between uplink and downlink signals in the corresponding ONU 160. The use of time-division multiplexing (e.g., through a suitable TDMA protocol) prevents collisions, at WDM receiver 114, between the uplink signals generated by different ONUs 160 of the same ONU group 170.

In an alternative embodiment, each ONU group 170 may be configured to employ different respective carrier wavelengths for uplink and downlink signals, provided that the corresponding configuration modifications are implemented at OLT 110. The optical circulator 162 may then be replaced, for example, by an optical pass-band or dichroic filter. Certain embodiments of router 130 enable this asymmetric uplink/downlink wavelength configuration without requiring a change in the general architecture of WDM-PON system 100. The relevant principles of operation and certain enabling physical structures are described in more detail below in reference to FIGS. 2-6. In one embodiment, WDM-PON system 100 is configured to operate so that all downlink signals are located in a spectral band near 1.55 μm, and all uplink signals are located in a spectral band near 1.3 μm. For this embodiment to operate properly, various relevant system components with a wavelength-dependent response (such as, for example, cyclic or periodic optical filters) need to maintain their functionality across relatively wide wavelength ranges.

Figure 2:
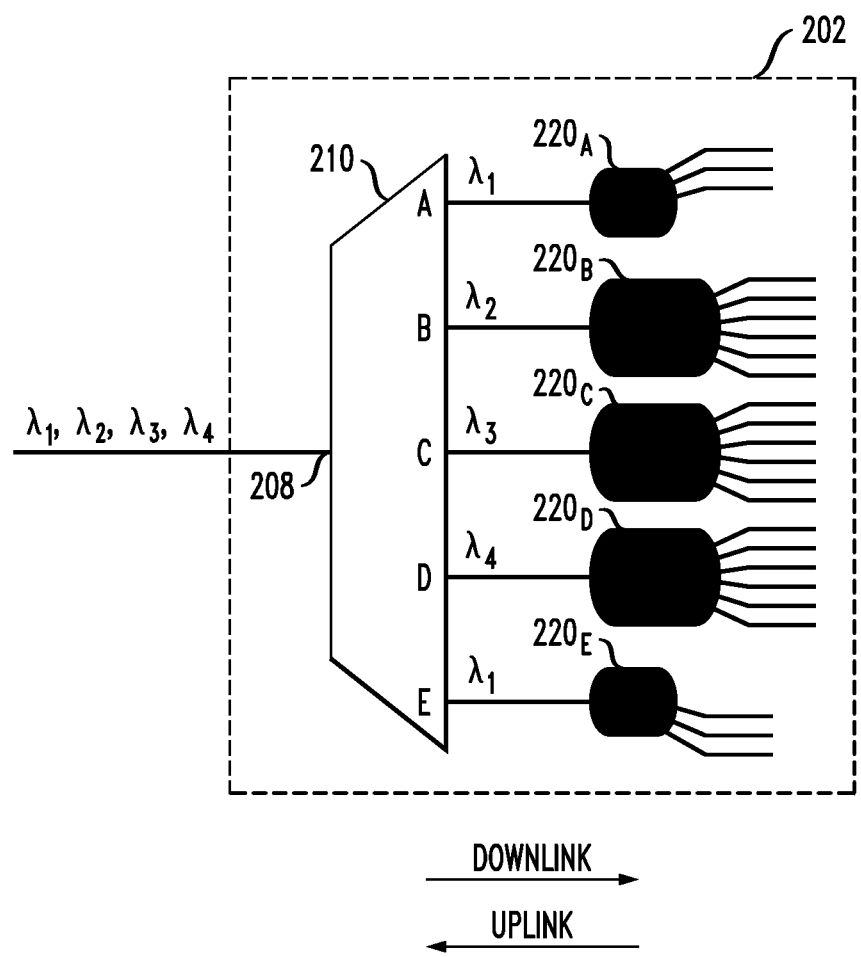
FIG. 2 shows a block diagram of a planar waveguide circuit that can be used in the WDM-PON system of FIG. 1 according to one embodiment of the invention.

FIG. 2 shows a block diagram of a planar waveguide circuit 200 that can be used in system 100 according to one embodiment of the invention. More specifically, the embodiment of circuit 200 shown in FIG. 2 can be used to replace router 130 and splitters/combiners 140$_1$-140$_N$ in an embodiment of system 100 corresponding to N=4 (for 4 wavelengths, although the device has 5 ports, A-E) and K=6. One of ordinary skill in the art will understand that various other embodiments of circuit 200 can be used to implement various respective embodiments of system 100 corresponding to other N and/or K values.

Circuit 200 includes a passive arrayed-waveguide-grating (AWG) router 210 and five optical power splitters/combiners 220$_A$-220$_E$, all implemented on a common planar substrate 202. AWG router 210 is illustratively shown as having a single port 208 at its first side and a set of five ports labeled A-E at its second side. Ports A and E are equivalent to each other in terms of their wavelength-routing configuration, with each of them being configured to handle signals with carrier wavelength $\lambda_1$. More specifically, if an optical signal with carrier wavelength $\lambda_1$ is applied to port 208, then nominally one half of the transmitted optical power of that signal is routed to port A and nominally one half of the transmitted optical power of that signal is routed to port E. Therefore, for downlink optical signals with carrier wavelength $\lambda_1$, AWG router 210 has the dual functionality of a wavelength router and a 3-dB optical power splitter. For uplink optical signals with carrier wavelength $\lambda_1$ applied to ports A and E, AWG router 210 has the dual functionality of a wavelength router and an optical power combiner.

Port A is coupled to optical power splitter/combiner 220$_A$. Port E is similarly coupled to optical power splitter/combiner 220$_E$. Each of power splitters/combiners 220$_A$ and 220$_E$ is a (1×3) optical power splitter/combiner. Therefore, for downlink optical signals with carrier wavelength $\lambda_1$, circuit 200 performs one-to-six power splitting. If circuit 200 is deployed in system 100, then the three peripheral ports of optical power splitter/combiner 220$_A$ and the three peripheral ports of optical power splitter/combiner 220$_E$ can be configured, e.g., to direct downlink signals to and receive uplink signals from up to six respective ONUs 160 of ONU group 170$_1$ (see FIG. 1).

For optical signals with carrier wavelengths $\lambda_2$, $\lambda_3$, and $\lambda_4$, AWG router 210 has a conventional functionality of a wavelength router only. More specifically, wavelength $\lambda_2$ is routed between ports 208 and B; wavelength $\lambda_3$ is routed between ports 208 and C; and wavelength $\lambda_4$ is routed between ports 208 and D. Ports B-D are coupled to optical power splitters/combiners $220_B$-$220_D$, respectively. Each of optical power splitters/combiners $220_B$-$220_D$ is a (1×6) optical power splitter/combiner. Therefore, for downlink optical signals with carrier wavelengths $\lambda_2$, $\lambda_3$, and $\lambda_4$, circuit 200 performs one-to-six power splitting for each of said wavelengths. If circuit 200 is deployed in system 100, then the six peripheral ports of each of optical power splitters/combiners $220_B$-$220_D$ can be configured, e.g., to direct downlink signals to and receive uplink signals from up to six respective ONUs 160 of ONU groups $170_2$-$170_4$, respectively (not explicitly shown in FIG. 1). Depending on the system specifications, different optical power splitters/combiners 220 may be designed to implement different respective splitting ratios for the respective wavelengths.

Representative benefits/advantages of using various embodiments of circuit 200 in system 100 will become more fully apparent from the description provided below, e.g., in reference to FIGS. 4B-4C.

Figure 3:
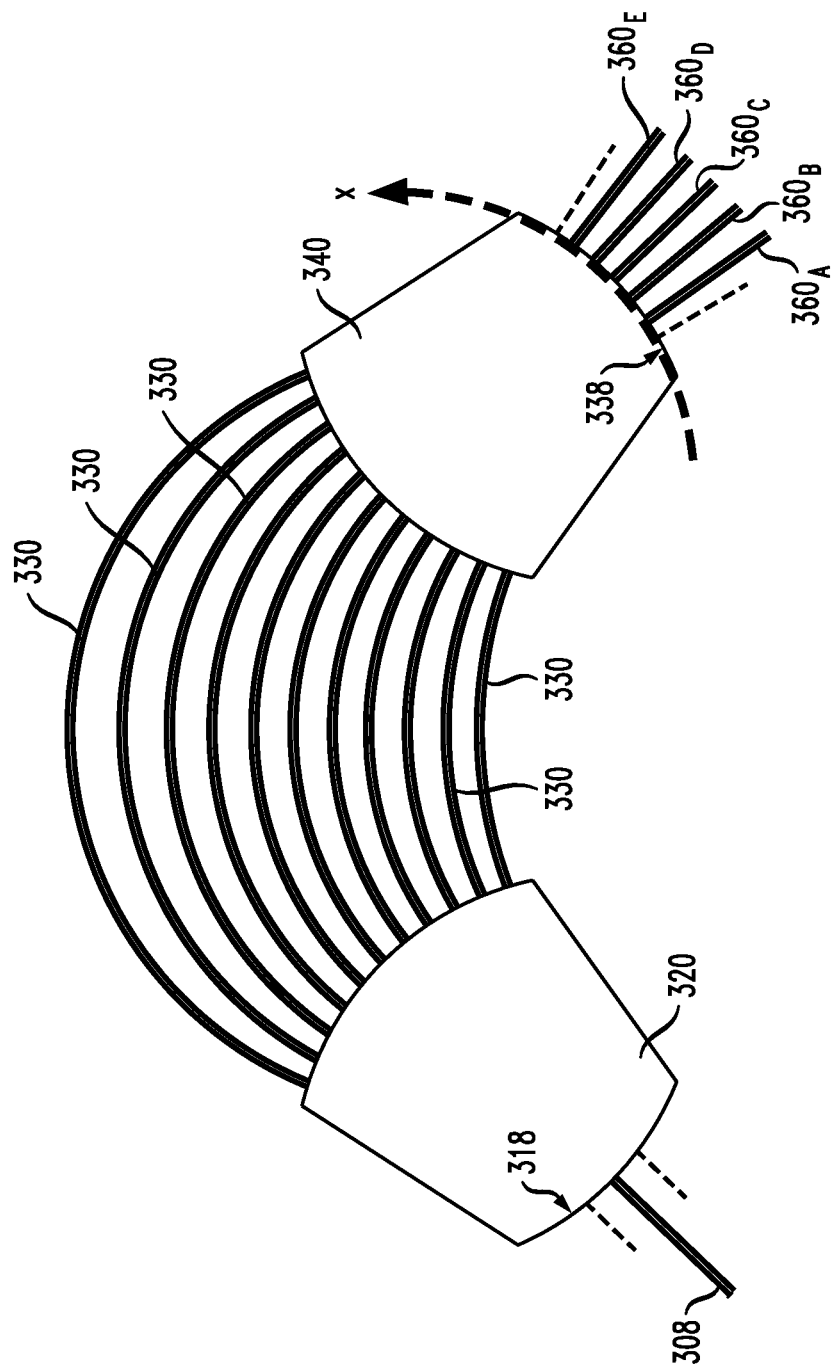
FIG. 3 schematically shows the layout of an AWG router that can be used in the planar waveguide circuit of FIG. 2 according to one embodiment of the invention.

FIG. 3 schematically shows the layout of a passive AWG router 300 that can be used as AWG router 210 (FIG. 2) according to one embodiment of the invention. Passive AWG router 300 has a waveguide 308 at its first side and five waveguides $360_A$-$360_E$ at its second side. Waveguides $360_A$-$360_E$ are arranged in a planar lateral array. Waveguide 308 in AWG router 300 corresponds to port 208 in AWG router 210. Waveguides $360_A$-$360_E$ in AWG router 300 correspond to ports A-E, respectively, in AWG router 210.

AWG router 300 has two waveguide couplers (also sometimes referred to as star couplers, planar regions, or slabs) 320 and 340 connected by a lateral array of waveguides 330. Different waveguides 330 have different respective lengths, with the lengths generally increasing from the bottom to the top of FIG. 3. A terminus of waveguide 308 is located at an edge 318 of star coupler 320. Termini of waveguides $360_A$-$360_E$ are located at an edge 338 of star coupler 340. The positions, in which the termini of waveguides $360_A$-$360_E$ are placed, are selected based on an inventive concept and differ from representative prior-art positions. An explanation of this placement is provided below in reference to FIGS. 4A-4C.

In one embodiment, the cores of waveguides 308, 330, and 360 and the bodies of couplers 320 and 340 are made of the same material, which has a higher refractive index than the cladding material around the cores and the coupler. A representative core material is doped silicon oxide.

Figure 4A:
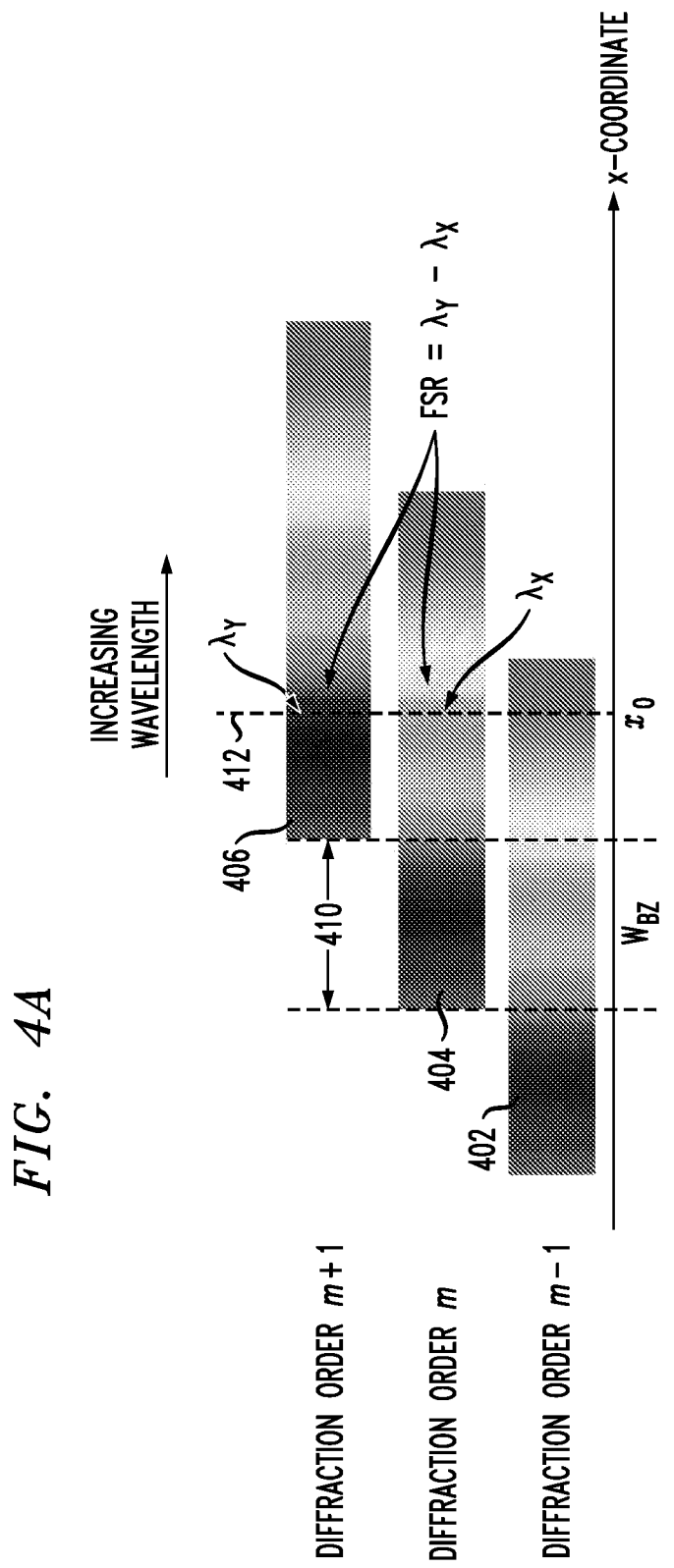
FIGS. 4A-4B graphically illustrate a representative method of selecting waveguide positions in the AWG router of FIG. 3.
Figure 4B:
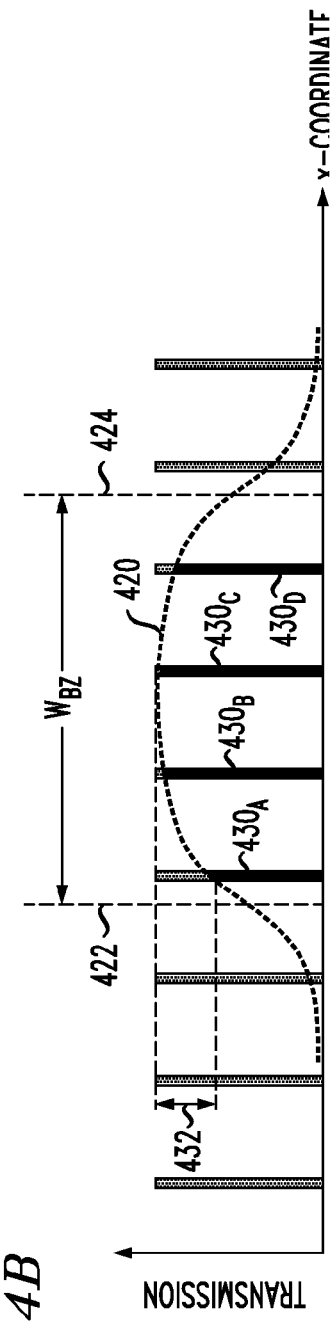
Figure 4C:
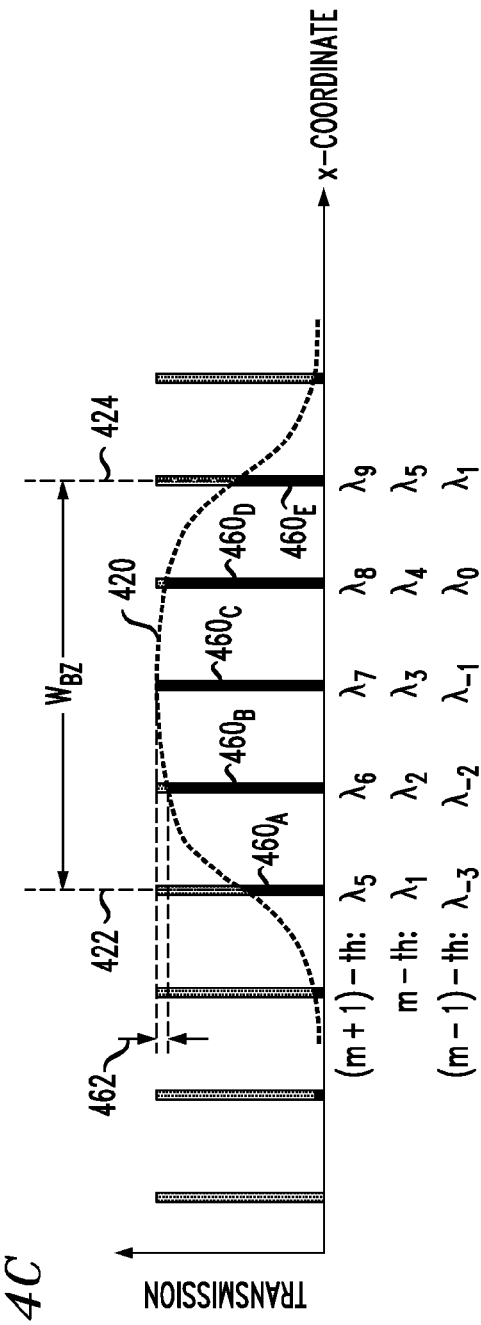
FIG. 4C graphically illustrates a method of selecting waveguide positions in the AWG router of FIG. 3 according to one embodiment of the invention.

FIGS. 4A-4C graphically illustrate methods of selecting waveguide positions in AWG router 300.

An arrayed waveguide grating, such as that used to implement AWG router 300, is usually designed to operate in a relatively high diffraction order, such as about the twentieth or thirtieth diffraction order. If the arrayed waveguide grating is designed for the m-th diffraction order, then it usually has comparable diffraction efficiency for several adjacent orders, such as the (m−1)-th and the (m+1)-th. Light corresponding to different adjacent diffraction orders may spatially overlap.

FIG. 4A graphically shows three representative dispersed-light stripes 402-406 generated by an arrayed waveguide grating at the corresponding edge of its star coupler, such as edge 338 of star coupler 340 in AWG router 300 (see FIG. 3). Horizontal axis X in FIG. 4A represents the spatial coordinate along the edge of the star coupler, e.g., in the manner indicated by the dashed line in FIG. 3 for edge 338. For clarity, stripes 402-406 are shown as being vertically offset with respect to one another. In reality, stripes 402-406 would be spatially superimposed. Stripe 402 corresponds to the (m−1)-th diffraction order. Stripe 404 corresponds to the m-th diffraction order. Stripe 406 corresponds to the (m+1)-th diffraction order.

Double-headed arrow 410 indicates the width of the grating's Brillouin zone ($W_{BZ}$). This width can be defined as the spatial offset (e.g., measured in microns) between the two instances of the same wavelength, but corresponding to two adjacent diffraction orders, as indicated in FIG. 4A. The free spectral range (FSR) of the grating can be defined as the spectral separation (e.g., in Hz or nm) between two spatially superimposed wavelengths corresponding to two adjacent diffraction orders. For example, a spatial location having coordinate $x_0$ indicated in FIG. 4A by a dashed line 412 receives wavelength $\lambda_X$ from the m-th diffraction order (or stripe 404) and wavelength $\lambda_Y$ from the (m+1)-th diffraction order (or stripe 406). The FSR value expressed in nm is therefore $\lambda_X$–$\lambda_Y$. One skilled in the art will understand that the FSR value expressed in frequency units can be obtained, e.g., by appropriate conversion of nm into Hz.

Referring now to FIGS. 4B and 4C, a curve 420 in each of these figures shows representative transmission characteristics of the grating as measured along the corresponding edge of its star coupler, such as edge 338 of star coupler 340 in FIG. 3. Note that curve 420 has a bell-like shape. The middle portion of curve 420 is relatively flat. Vertical dashed lines 422 and 424 mark the locations of the two 3-dB (50%) attenuation points for curve 420. One skilled in the art will understand that the distance between dashed lines 422 and 424 is equal to $W_{BZ}$, the width of the grating's Brillouin zone as defined above in reference to FIG. 4A, arrow 410.

When the AWG designer selects locations along the edge of the star coupler for the placement of the corresponding waveguide termini, the shape of curve 420 is given a great deal of consideration. One reason is that the system specifications usually require that different wavelength channels of the grating be on a specified, regularly spaced frequency grid and that the insertion-loss disparity between different wavelength channels be smaller than a specified, relatively small threshold value. These two requirements are usually interpreted as favoring a placement of the waveguide termini within the middle, relatively flat portion of curve 420 and as far as possible from the Brillouin-zone (BZ) edges indicated by dashed lines 422 and 424.

Vertical bars $430_A$-$430_D$ in FIG. 4B indicate one possible placement of the waveguide termini that meets the above-indicated criteria for an arrayed waveguide grating designed with an FSR that is equal to four inter-channel frequency intervals. The filled portions of bars $430_A$-$430_D$ indicate the relative optical power received at the respective locations in accordance with transmission curve 420. A double-headed arrow 432 indicates the insertion-loss disparity corresponding to this placement of waveguide termini. Note that the insertion-loss disparity indicated by arrow 432 can be slightly decreased if the whole bar comb represented by bars $430_A$-$430_D$ is moved slightly to the right so that bars $430_A$ and $430_D$ become equidistant from lines 422 and 424, respectively.

Vertical bars $460_A$-$460_E$ in FIG. 4C indicate a placement of the waveguide termini according to one embodiment of the invention. This placement differs from the placement shown in FIG. 4B in that two of the bars, i.e., bars $460_A$ and $460_E$, are placed directly at the BZ edges indicated by dashed lines 422 and 424. Similar to FIG. 4B, the filled portions of bars $460_A$-

460$_E$ in FIG. 4C indicate the relative optical power received at the respective locations in accordance with transmission curve 420.

The table located under the abscissa in FIG. 4C lists, by the diffraction order, the wavelengths received at each of the locations corresponding to bars 460$_A$-460$_E$. The listed wavelengths are related to one another via Eq. (1):

$$f_i = f_0 + i\Delta F \qquad (1)$$

where i is an integer; $f_i$ is the frequency corresponding to wavelength $\lambda_i$; $f_0$ is the frequency corresponding to wavelength $\lambda_0$; and $\Delta F$ is a constant (representing frequency spacing). In one embodiment, $\Delta F=100$ GHz.

Inspection of the table reveals that both of the locations corresponding to bars 460$_A$ and 460$_E$ receive wavelengths $\lambda_1$ and $\lambda_5$. More specifically, the location corresponding to bar 460$_A$ receives wavelengths $\lambda_1$ and $\lambda_5$ from the m-th and (m+1)-th diffraction orders, respectively. The location corresponding to bar 460$_E$ receives wavelengths $\lambda_1$ and $\lambda_5$ from the (m−1)-th and m-th diffraction orders, respectively. The total optical power transmitted by the grating at wavelength $\lambda_1$ is represented by the sum of the filled portions of bars 460$_A$ and 460$_E$ and, as such, is very close to the optical power transmitted at wavelength $\lambda_3$ represented by the filled portion of bar 460$_C$. A similar observation applies to wavelength $\lambda_5$.

If the waveguide configuration of FIG. 4C is used to route signals having carrier wavelengths $\lambda_1$-$\lambda_4$, then the resulting effective insertion-loss disparity can be represented by arrows 462, which take into account the fact that the filled portions of bars 460$_A$ and 460$_E$ can be summed up. By comparing arrows 432 (FIG. 4B) and 462 (FIG. 4C) one finds that the waveguide configuration of FIG. 4C advantageously provides a smaller insertion-loss disparity than the waveguide configuration of FIG. 4B. It is also worth noting that this reduction in the insertion-loss disparity is achieved without introducing any additional loss to any of the other ports. In addition to the smaller insertion-loss disparity, the waveguide configuration of FIG. 4C also provides the 3-dB splitter functionality, which can be used in planar waveguide circuit 200 (FIG. 2) and system 100 (FIG. 1) as already indicated above.

Further inspection of the table in FIG. 4C reveals that the waveguide configuration of FIG. 4C enables the use of different respective wavelengths for uplink and downlink signals corresponding to each of ONU groups 170 (see FIG. 1). For example, for ONU group 170$_1$, wavelength $\lambda_1$ can be used for downlink signals (as already indicated in FIG. 1) and wavelength $\lambda_5$ can be used for uplink signals. Due to the cyclic wavelength response of the grating, it is relatively straightforward to demonstrate that any wavelength $\lambda_q = \lambda_1 + q \times FSR$, where q is an integer, will satisfy the constraints for being used as a carrier wavelength for uplink signals. For ONU group 170$_2$ (not explicitly shown in FIG. 1), wavelength $\lambda_2$ can be used for downlink signals (as already indicated in FIG. 1) and wavelength $\lambda_6$ and/or wavelength $\lambda_{-2}$ can be used for uplink signals, etc. Similarly, any wavelength $\lambda_p = \lambda_2 + p \times FSR$, where p is an integer, will satisfy the constraints for being used as a carrier wavelength for uplink signals for channel number 2. This characteristic is important in a WDM-PON system, in which the downstream and upstream wavelengths are assigned to two different wavelength bands. Furthermore, in such a WDM-PON system, the cyclic response of the passive wavelength router significantly reduces the tuning range that the lasers in transmitters 164 (FIG. 1) need to have. In fact, in one embodiment, each transmitter 164 may be tunable over a total range spanning only one FSR of the passive wavelength router and yet be capable to generate one of the accepted carrier wavelengths, regardless of the absolute value of that wavelength. This characteristic greatly reduces the complexity of transmitters 164, which facilitates a concomitant cost reduction as well as a reduction in the power consumption (the latter being particularly important to WDM-PON applications).

Figure 5:
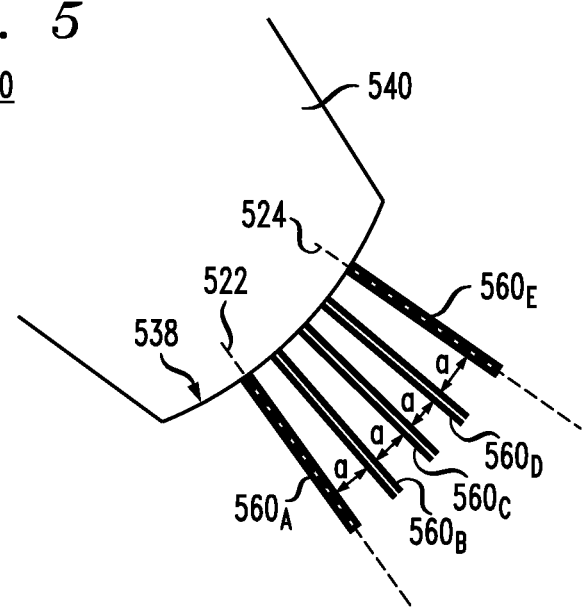
FIG. 5 schematically shows the layout of a circuit portion that can be used to implement a corresponding portion of the passive AWG router shown in FIG. 3 according to one embodiment of the invention.

FIG. 5 schematically shows the layout of a circuit portion 500 that can be used to implement the corresponding portion of passive AWG router 300 (FIG. 3) according to one embodiment of the invention. The analogous elements in FIGS. 3 and 5 have labels with the same last two digits. Dashed lines 522 and 524 mark the boundaries of the grating's Brillouin zone and are analogous to dashed lines 422 and 424, respectively, of FIG. 4C. The positions of the termini of waveguides 560$_A$-560$_E$ at edge 538 correspond to the positions of bars 460$_A$-460$_E$, respectively, in FIG. 4C. Therefore, the length of the arc that connects waveguides 560$_A$ and 560$_E$ along edge 538 is $W_{BZ}$. One skilled in the art will appreciate that circuit portion 500 advantageously has a relatively small insertion-loss disparity between its wavelength channels and can be used to implement the wavelength-routing configurations that are discussed above in reference to FIG. 4C.

Several other features of circuit portion 500 are noteworthy. For example, star coupler 540 has a width, at edge 538, that is larger than the width of the grating's Brillouin zone. In contrast, a representative prior-art star coupler has a width that may be smaller than the grating's Brillouin zone. The latter property is a consequence of the tendency to pack the waveguides as close to the middle portion of the grating's transmission curve as possible, e.g., as already indicated above in reference to FIG. 4B.

The inter-channel frequency spacing $\Delta F$ imposed by the specified frequency grid (see Eq. (1)) determines the spatial separation a between adjacent waveguides 560 at edge 538. The above-described characteristics of an AWG router having circuit portion 500 force a waveguide configuration in which the width ($W_{BZ}$) of the grating's Brillouin zone is approximately equal to 4a. In general, if the AWG router is designed for N wavelength channels and in accordance with certain principles of the invention, then its waveguide layout generally satisfies Eq. (2):

$$W_{BZ} = Na \qquad (2)$$

In contrast, prior-art waveguide layouts do not need to satisfy Eq. (2) due to the possible arbitrary positioning of the corresponding waveguides, e.g., as already indicated above in reference to FIG. 4B.

Figure 6:
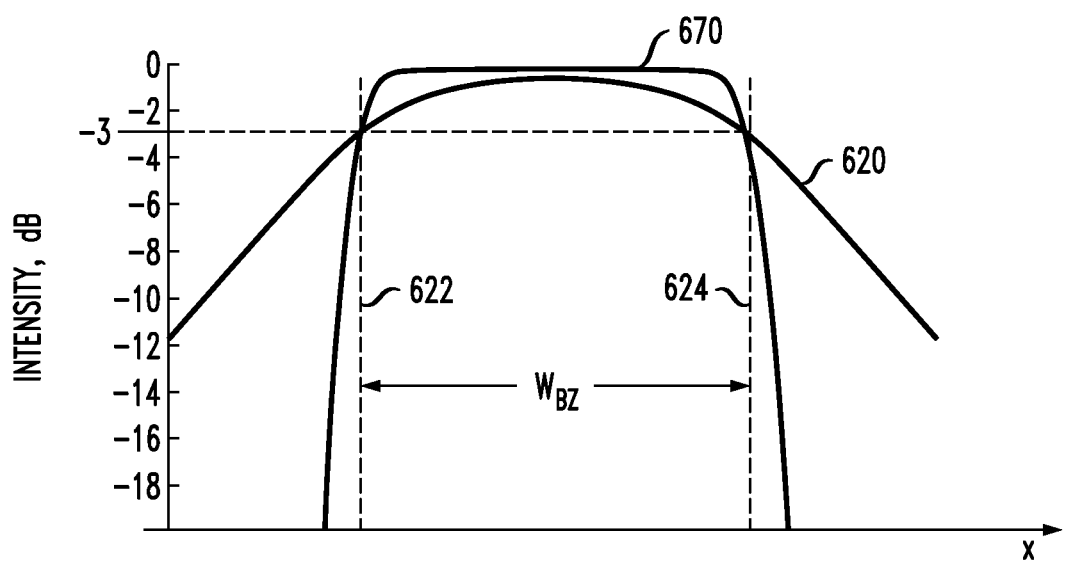
FIG. 6 graphically illustrates a possible AWG-router design according to one embodiment of the invention.

FIG. 6 graphically illustrates a possible AWG-router design variation according to one embodiment of the invention. More specifically, a curve 620 shown in FIG. 6 is an AWG transmission curve that is analogous to transmission curve 420 shown in FIGS. 4B and 4C. Dashed lines 622 and 624 mark the boundaries of the grating's Brillouin zone and are analogous to dashed lines 422 and 424, respectively, of FIG. 4C.

In general, different AWG designs produce different transmission curves. For example, commonly owned U.S. Pat. No. 6,873,766 issued to Corrado P. Dragone discloses an AWG design characterized by a flattened transmission curve that is similar to a transmission curve 670 shown in FIG. 6. This patent is incorporated herein by reference in its entirety.

One beneficial feature of Dragone's design compared to the AWG design that produces transmission curve 620 is that the former enables a reduction in the insertion-loss disparity for the waveguides located in the middle of the grating's Brillouin zone. However, for the same FSR, both designs have the same $W_{BZ}$ and the same location of the BZ boundaries, as indicated by dashed lines 622 and 624. Various embodiments of the present invention, e.g., as exemplified by FIG. 4C, can advantageously be used to effectively extend the flat portion of transmission curve 670 substantially all the way to the BZ boundaries. In this sense, various embodiments of the present invention and Dragone's design complement each other and can advantageously be implemented in the same waveguide circuit in a synergistic manner.

While this invention has been described with reference to illustrative embodiments, this description is not intended to be construed in a limiting sense.

For example, although circuit 200 (FIG. 2) has been described as having AWG router 210 coupled to optical power splitters/combiners 220, other circuit configurations are also possible. For example, instead of being connected to optical power splitters/combiners $220_A$ and $220_E$, ports A and E of AWG router 210 may both be connected to a single optical power combiner configured to combine downlink signals. Such a configuration cancels the power-splitter functionality of AWG router 210 with respect to downlink signals so that the resulting circuit can operate as a conventional AWG router, albeit advantageously having a relatively small insertion-loss disparity between its different wavelength channels.

Several additional points and/or observations are worth considering for proper implementation of the circuit that merges ports A and E (FIG. 2), which helps to avoid excessive loss of optical power in the corresponding combiner:

(1) If the constituent waveguides are single-mode waveguides, then it is beneficial to combine ports A and E coherently. This implies a waveguide configuration in which the optical paths from the waveguide termini located at the edge of the star coupler to the combiner have the same optical length. It is also preferred that the phases of the corresponding optical signals are appropriately controlled to enable efficient coupling of the input light into a single output waveguide;

(2) Best results are achieved when the combiner is implemented as a 2×1 Y-shaped combiner or a symmetric 2×1 multi-mode interferometer (MMI), e.g., because these combiners do not have intrinsic phase differences between their respective arms. In contrast, a 2×2 optical coupler is characterized by a 90-degree phase jump that has to be compensated externally, e.g., by adjusting the length difference of the two incoming waveguides. However, due to the material-index dispersion, different waveguide lengths correspond to slightly different phases and thus the coupling efficiency may become wavelength dependent. This wavelength dependence has implications for system configurations, in which the 1.55 μm and 1.3 μm spectral bands are used at the same time.

(3) To achieve broadband operation, waveguide 308 is best positioned near the center of edge 318 (see FIG. 3). This position is a good choice, e.g., because the resulting spatial symmetry substantially forces the optical phase at the termini of waveguides $360_A$ and $360_E$ to be the same.

(4) Phase control may not be needed in a combiner configuration having two single-mode waveguides merged into a single multimode waveguide. In this configuration, all optical power from the single-mode waveguides can couple into different modes of the multimode waveguide, thereby reducing possible coupling losses. The multimode waveguide can be short enough so that the deleterious effects of mode dispersion therein are sufficiently small. In one exemplary configuration, the multimode waveguide may be terminated by a photodiode, which can for example be a part of the corresponding WDM receiver.

Although AWG router 300 (FIG. 3) has been described as having a single waveguide (e.g., waveguide 308) coupled to edge 318 of star coupler 320, embodiments with multiple waveguides coupled to that edge are also possible. For example, one or more additional waveguides may be placed along edge 318 so that the resulting AWG router is a cyclic AWG router. The two dashed lines next to waveguide 308 in FIG. 3 indicate possible positions of two of such additional waveguides. Furthermore, using the cyclic routing properties of the AWG structure, the resulting AWG router can be configured to route a particular carrier wavelength applied to one of the additional optical waveguide to both optical waveguide $360_A$ and optical waveguide $360_E$. In one embodiment, more waveguides may be added at edge 338, e.g., as indicated by the two dashed lines shown in FIG. 3 next to waveguides $360_A$ and $360_E$, respectively.

Although various exemplary AWG routers described in this specification are designed for four wavelength channels, various embodiments of the invention are not so limited. Using certain inventive aspects disclosed herein, one of ordinary skill in the art will be able to design an AWG router for substantially any desired number of wavelength channels.

Although various embodiments have been described in reference to AWG routers, principles of the invention can also be applied to Echelle gratings. More specifically, instead of using an arrayed waveguide grating in transmission, an Echelle grating uses an etched step grating in reflection. One skilled in the art will understand that the positioning of the input and output ports described above in reference to an AWG router is similarly applicable to an Echelle-type router. Similar to an AWG router, an Echelle-type router can be integrated on a silica material platform.

In various alternative embodiments, alternative material platforms, such as silicon, III-V semiconductor materials, and polymer materials, can also be used.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Throughout the detailed description, the drawings, which are not to scale, are illustrative only and are used in order to explain, rather than limit the invention. The use of terms such as height, length, width, top, bottom, is strictly to facilitate the description of the invention and is not intended to limit the invention to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

What is claimed is:

1. An apparatus, comprising a passive arrayed-waveguide-grating (AWG) router that comprises:
    a first optical star coupler having a first optical waveguide coupled to a first edge thereof and a first lateral array of optical waveguides coupled to an opposite second edge thereof; and
    a second optical star coupler having the first lateral array of optical waveguides coupled to a first edge thereof and a second lateral array of optical waveguides coupled to an opposite second edge thereof;
    wherein the passive AWG router is configured to route a first carrier wavelength applied to the first optical waveguide to both a first optical waveguide of the second lateral array and a second optical waveguide of the second lateral array, said first and second optical waveguides of the second lateral array being separated from one another by at least one other optical waveguide positioned between them in said second lateral array; and
    wherein the passive AWG router is configured to transfer approximately equal portions of optical power of said first carrier wavelength to the first optical waveguide of the second lateral array and to the second optical waveguide of the second lateral array.

2. The apparatus of claim 1, wherein said first and second optical waveguides of the second lateral array are separated from one another by a distance that is nominally equal to the Brillouin-zone width of the passive AWG router, said distance being measured along the second edge of the second optical star coupler.

3. The apparatus of claim 2, wherein said first and second optical waveguides of the second lateral array are equidistant from the center of the first edge.

4. The apparatus of claim 1, wherein said first and second optical waveguides of the second lateral array are separated from one another by a plurality of regularly spaced optical waveguides positioned between them in said second lateral array.

5. The apparatus of claim 1, wherein the second lateral array comprises one or more optical waveguides positioned in the second lateral array outside the sector bounded by the first and second optical waveguides.

6. The apparatus of claim 1, wherein the second edge of the second optical star coupler has a length that is greater than the Brillouin-zone width of the passive AWG router.

7. The apparatus of claim 1, wherein the passive AWG router is further configured to route a second carrier wavelength applied to the first optical waveguide to both the first optical waveguide of the second lateral array and the second optical waveguide of the second lateral array, said second carrier wavelength being offset from the first carrier wavelength by a free spectral range of the passive AWG router expressed in wavelength units.

8. The apparatus of claim 1, further comprising a plurality of optical power splitters, each coupled to a respective one of the optical waveguides of the second lateral array and configured to split an optical power received therefrom into portions and direct said split portions along different respective propagation paths.

9. The apparatus of claim 8, wherein the passive AWG router further comprises a substrate having a planar surface, wherein the first optical star coupler, the second optical star coupler, and the plurality of optical power splitters are implemented on said substrate.

10. The apparatus of claim 8, wherein the plurality of optical power splitters comprises:
    a first optical power splitter coupled to the first optical waveguide of the second lateral array and configured to split the optical power received therefrom into k split portions, where k is a positive integer greater than one;
    a second optical power splitter coupled to the second optical waveguide of the second lateral array and configured to split the optical power received therefrom into k split portions; and
    at least a third optical power splitter coupled to said one other optical waveguide of the second lateral array and configured to split the optical power received therefrom into 2k split portions.

11. The apparatus of claim 10, further comprising:
    a first group of optical network units, each coupled to the first optical power splitter or the second optical power splitter; and a second group of optical network units, each coupled to the third optical power splitter.

12. The apparatus of claim 11, further comprising an optical line terminal coupled to the first optical waveguide coupled to the first edge of the first optical star coupler and configured to:
broadcast, via the passive AWG router, optical signals having the first carrier wavelength to the first group of optical network units; and
broadcast, via the passive AWG router, optical signals having a second carrier wavelength to the second group of optical network units.

13. The apparatus of claim 1, wherein:
the first optical star coupler further has a second optical waveguide coupled to the first edge thereof; and
the passive AWG router is further configured to route a second carrier wavelength applied to the second optical waveguide to both the first optical waveguide of the second lateral array and the second optical waveguide of the second lateral array.

14. The apparatus of claim 1, further comprising an optical power combiner coupled to the first optical waveguide of the second lateral array and the second optical waveguide of the second lateral array and configured to combine optical power received from said first and second optical waveguides of the second lateral array.

15. An apparatus, comprising a passive arrayed-waveguide-grating (AWG) router that comprises:
a first optical star coupler having a first optical waveguide coupled to a first edge thereof and a first lateral array of optical waveguides coupled to an opposite second edge thereof; and
a second optical star coupler having the first lateral array of optical waveguides coupled to a first edge thereof and a second lateral array of optical waveguides coupled to an opposite second edge thereof;
wherein the passive AWG router is configured to route a first carrier wavelength applied to the first optical waveguide to both a first optical waveguide of the second lateral array and a second optical waveguide of the second lateral array, said first and second optical waveguides of the second lateral array being separated from one another by at least one other optical waveguide positioned between them in said second lateral array; and
wherein the passive AWG router is further configured to route a second carrier wavelength applied to the first optical waveguide to both the first optical waveguide of the second lateral array and the second optical waveguide of the second lateral array, said second carrier wavelength being offset from the first carrier wavelength by a free spectral range of the passive AWG router expressed in wavelength units.

16. An apparatus, comprising a passive arrayed-waveguide-grating (AWG) router that comprises:
a first optical star coupler having a first optical waveguide coupled to a first edge thereof and a first lateral array of optical waveguides coupled to an opposite second edge thereof; and
a second optical star coupler having the first lateral array of optical waveguides coupled to a first edge thereof and a second lateral array of optical waveguides coupled to an opposite second edge thereof;
wherein the passive AWG router is configured to route a first carrier wavelength applied to the first optical waveguide to both a first optical waveguide of the second lateral array and a second optical waveguide of the second lateral array, said first and second optical waveguides of the second lateral array being separated from one another by at least one other optical waveguide positioned between them in said second lateral array; and
wherein the apparatus further comprises an optical power combiner coupled to the first optical waveguide of the second lateral array and the second optical waveguide of the second lateral array and configured to combine optical power received from said first and second optical waveguides of the second lateral array.

17. The apparatus of claim 16, wherein said first and second optical waveguides of the second lateral array are separated from one another by a distance that is nominally equal to the Brillouin-zone width of the passive AWG router, said distance being measured along the second edge of the second optical star coupler.

18. The apparatus of claim 17, wherein said first and second optical waveguides of the second lateral array are equidistant from the center of the first edge.

19. The apparatus of claim 16, wherein said first and second optical waveguides of the second lateral array are separated from one another by a plurality of regularly spaced optical waveguides positioned between them in said second lateral array.

20. The apparatus of claim 16, wherein the passive AWG router is further configured to route a second carrier wavelength applied to the first optical waveguide to both the first optical waveguide of the second lateral array and the second optical waveguide of the second lateral array, said second carrier wavelength being offset from the first carrier wavelength by a free spectral range of the passive AWG router expressed in wavelength units.

21. The apparatus of claim 16, wherein the passive AWG router further comprises a substrate having a planar surface, wherein the first optical star coupler, the second optical star coupler, and the optical power combiner are implemented on said substrate.

* * * * *